3,042,655
NOVOLAK AND METHOD OF MANUFACTURE
THEREOF
John T. Massengale, West Chester, and Frederick C. Bender, Chester, Pa., assignors to American Viscose Corporation, Philadelphia, Pa., a corporation of Delaware
No Drawing. Filed Jan. 22, 1960, Ser. No. 4,009
13 Claims. (Cl. 260—51)

This invention relates to a method of forming improved deterioration-resistant molding and coating phenolic resins, a novolak useful for the manufacture of improved cured resins and products formed by the novel process.

It is an object of this invention to provide a method of producing a phenolic molding and coating resin having superior resistance to alkali attack, acid attack and oxidizing agents.

It is another object of this invention to provide a new novolak which is readily cured with known curing agents to provide new and improved molding and coating resins.

It is still another object of this invention to provide a novolak which readily reacts with an aldehyde in the presence of a catalyst to produce an improved deterioration-resistant molding and coating resin.

It is a further object of this invention to provide an improved hydrophobic phenolic molding and coating resin having greater resistance to acid, alkali and to oxidizing agents than conventional phenol-formaldehyde resins.

A novolak is defined as a resin which has no reactive methylol groups in the molecule and is incapable of condensing with other novolak molecules without the addition of hardening agents. Novolaks are usually supplied by resin manufacturers to molders and coating applicators.

In accordance with this invention a novolak having the following formula,

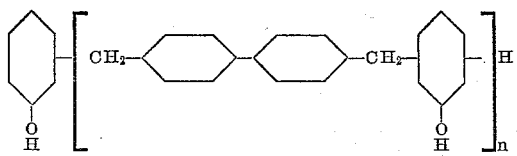

wherein $n$ is a whole number ranging from about 4 to about 10, is capable of reaction with curing agents in the presence of a catalyst to form improved coating and molding resins.

The novolak which enables the production of superior molding and coating resins is produced by condensing phenol with 4,4'-bis-(chloromethyl) biphenyl. It has been found that the phenolic reaction component is necessarily largely an unsubstituted phenol in order to obtain a novolak capable of producing satisfactory thermosetting resins. Generally, mol ratios of about 0.65 to 0.95, preferably from 0.75 to 0.9, mol of 4,4'-bis-(chloromethyl) biphenyl to 1 mol of phenol react to form a solid, low molecular weight resin. It is contemplated that part of the bis-(chloromethyl) biphenyl component can be substituted with from about 0.25 and up to 0.5 mol of formaldehyde in the reaction to form the novolak.

To bring the reaction temperature and time to within practical limits the use of a metal halide catalyst is preferred for manufacture of the novolak although hydrochloric acid itself acts catalytically. Examples of catalysts are anhydrous ferric chloride, anhydrous aluminum chloride, ferric bromide, magnesium chloride and the preferred zinc chloride. The halide catalyst is used in amounts ranging from 0.1 to 1% by weight based on the reactive ingredients. When utilizing the zinc chloride catalyst, it is preferably incorporated in amounts ranging from 0.12 to 0.2%.

Toluene is a preferred organic solvent for the novolak condensation reaction since it is inexpensive and readily available. Other useful solvent media include benzene, cyclohexane, carbon tetrachloride, ethylene dichloride and chloroform.

The reaction conditions under which the novolak is formed can vary greatly with respect to time, temperature and pressure. Advantageously, the reaction takes place at a temperature of about 100–120° C. at atmospheric pressure and over a refluxing period ranging from about 1 to 2 hours.

The low molecular weight resin formed under the foregoing conditions is a solid, usually tacky resin ranging in color from dark brown to light pink.

In order to prepare a resin useful for molding and coating, a second reaction is generally performed to produce a second stage resin. The hardening or curing of a novolak is a well recognized process and is usually carried out by molders and coating applicators rather than the resin manufacturer.

The most advantageous curing agent for this invention is an aldehyde which is used in conjunction with either an acidic catalyst or with a basic catalyst. The aldehydes include, for example, formaldehyde or formalin, paraformaldehyde, a polyoxymethylene resin; acetaldehyde, paraldehyde, a liquid acetaldehyde trimer; butyraldehyde, benzaldehyde, and furfural. The preferred aldehyde for this invention is formaldehyde. Formaldehyde is commercially available in aqueous solution at a concentration of about 37% with a small amount, from about 1–10%, of methanol.

The aldehyde is generally reacted with the novolak in amounts of from 0.1 to 0.5 mol aldehyde per mol of phenol in the novolak.

The acidic catalyst for the curing process is generally present in an amount from 0.1 up to about 3 weight percent of the reactive components. They include for example, hydrochloric acid, p-toluene sulfonic acid, ethyl toluene sulfonate, hydrobromic acid, phthalic anhydride, sulfuric acid, nitric acid, phosphoric acid and oxalic acid. Metallic halide catalysts used in the formation of the novolak are also useful catalysts for the curing process. The preferred acid catalyst for the curing step is hydrochloric acid in a concentrated solution (37% HCl) where hydrochloric acid is present in an amount ranging from 0.5 to 0.9% by weight based on the reactive ingredients.

The basic catalyst to facilitate curing is generally used in an amount ranging from 0.1 to about 3% by weight of the reactive component and these catalysts include, for example, ammonia, sodium hydroxide, barium hydroxide, magnesia, sodium carbonate, calcium carbonate and pyridine. The preferred basic catalyst is ammonia used in amounts of from about 0.5 to about 1.0%. Hexamethylene tetramine is a special substance which acts both as a curing agent and curing catalyst. It supplies formaldehyde to effect cross-linking of the resin and ammonia to catalyze the reaction. Hexamethylene tetramine is a preferred curing ingredient and is used in an amount ranging from about 5 to 25% by weight based on the total reactive components, and preferably from 10 to 20%.

The novolak of this invention is capable of further reaction with other compounds to form complex resins. For example, a preferred additional reactant is epichlorohydrin which is reacted with the novolak in the presence of sodium hydroxide to form an epoxy resin. This epoxy resin is then set or cured by reacting with an amine. The formation and curing of his type of resin is well known. The epoxy resins formed with the novolak of this invention are excellent coating materials.

In addition to the ability of the cured resins of this invention to produce superior molds, the resins are extremely useful as protective coatings for filaments and sheet or slab materials of the flexible, semi-flexible and non-flexible variety. The resin coatings are applied as aqueous dispersions or as lacquers using organic solvents including toluene and toluene-acetate mixtures. The aqueous dispersions and lacquers of this coating material will contain various other coating improving components, for example, drying oils such as linseed oil and tung oil, slip and anti-blocking agents, and plasticizers.

The molding resins of this invention are at times blended with other components to produce improved and less expensive moldings.

Fillers which include organic and inorganic substances are admixed with the resin prior to molding in amounts ranging from 10 to 65% of the molding composition. Examples of common fillers include cellulose derivatives such as ground flours of wood, nut shells and seed hulls; cellulosic fibers and comminuted cellulose; lignin, protein, nylon and carbon fillers are also used. Inorganic fillers such as asbestos, mica and diatomaceous earth are also useful molding composition components for some purposes.

Pigments and dyes in minor amounts are common ingredients of molding compositions and are useful for the compositions of this invention.

Molding lubricants are advantageously used in the molding composition to facilitate removal of the molded article from metallic molding equipment. Lubricants include fatty acids such as stearic, oleic and linoleic, metal salts of these acids such as zinc and magnesium stearates, vegetable oils such as castor oil and linseed oil, and mineral waxes. These lubricants are generally used in small amounts of less than 2% of the composition.

A general description of the reaction involved for this invention is as follows:

Phenol and metallic halide catalysts were mixed in sufficient organic solvent for the reaction. This mixture was stirred and brought to refluxing temperature. The 4,4'-bis-(chloromethyl) biphenyl dissolved in the same organic solvent was then slowly added to the mixture. After evolution of formed hydrochloric acid was complete the reaction mixture was washed and the solvent distilled off to leave the novolak resin. The formula equation for this reaction is as follows:

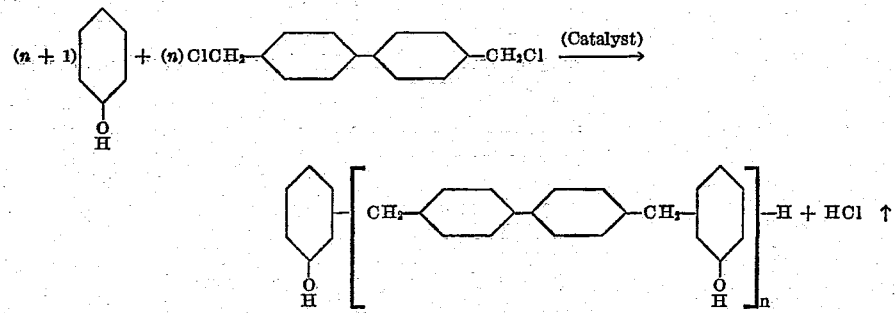

where $n = 4$ to $10$.

For a molding or coating resin, the low molecular weight resin or novolak was thereafter reacted with an aldehyde by grinding the solid resin to a powder and mixing with an aldehyde in an organic solvent and subsequently adding the curing catalyst solution dropwise. On heat-drying of this reaction mixture, a solid, brittle resin was recovered. The resin was found to be readily molded and as a molded product was more resistant to hot and cold acid, hot alkali and hot oxidizing agent. In addition the resin is an excellent protective coating material for filaments and sheets.

The following examples are set forth to demonstrate the method and products of this invention.

*Example I*

47.0 gms. of phenol, 0.2 gm. of zinc chloride and 250 ml. of toluene were charged to a 2-liter, 3-neck flask equipped with stirrer, thermometer, reflux condenser and dropping funnel. The mixture was stirred and brought to a reflux temperature of 110° C. A solution of 75.0 gms. of 4,4'-bis-(chloromethyl) biphenyl in 250 ml. of toluene was then dropped into the flask over a one hour period. After hydrogen chloride evolution had stopped, the reaction mixture was transferred to a separatory funnel and washed with three portions of hot (70° C.) water to remove the metal catalyst and any unreacted phenol. The separated organic phase containing the phenol-biphenyl polymer was a dark brown color. The organic phase was transferred to a 2-liter, 1-neck round bottom flask connected to an unpacked column and the toluene was distilled off under water aspirator vacuum. A light brown tacky solid, termed a novolak, remained after distillation which became brittle at room temperature. The weight of this low molecular weight resin was 86.1 gms.

The entire resinous product from the first reaction stage was charged to a 500 ml. round bottom, 1-neck flask and 0.1 gm. of p-toluene sulfonic acid was added with 1.5 gms. of para-formaldehyde. The reaction mixture was heated on a steam bath for two hours to obtain a pink, brittle solid which formed upon cooling to room temperature. 74.7 gms. of this solid resin was recovered.

The cured brittle resin from this second reaction stage was ground to a powder with a mortar and pestle. Three molded samples were prepared with this powder using a small stub plunger mold which produced a "button" about three-fourths inch in diameter and one-eighth inch thick. The samples were prepared under molding pressure ranging from 1,000 to 3,000 p.s.i., a temperature ranging from 140 to 190° C. with molding periods of from 75 to 180 seconds. In each case the molded samples formed were smooth, hard discs demonstrating the usefulness of the produced resin as thermosetting molding material.

*Example II*

10 gms. of a novolak as prepared in Example I were charged to a 500 ml. round bottom flask along with 5 ml. of formaldehyde, 20 ml. of toluene and 2 drops of concentrated hydrochloric acid. The mixture was stripped to dryness and a hard brittle resinous mass remained.

The resin was thoroughly ground in a mortar and used to prepare 8 molded samples. The molds were made on the same apparatus as described in Example I. The molding conditions included pressures from 2,000 to 3,000 p.s.i., a temperature ranging from 140 to 220° C. and a molding period from 60 to 300 seconds. Four of these samples were made with molding mixtures containing 10 gms. of the mold resin and from 0.45 to 1.5 gms. of hexamethylene tetramine. These four samples were poor molds which did not set. Two of the remaining samples were prepared with 10 gms. of the mold resin mixed with 0.2 gm. of para-formaldehyde. Food molded samples were produced in both cases. The remaining two samples were produced with the mold resin alone and these samples demonstrated good molding properties.

*Example III*

The entire crude obtained in the process of chloromethylation of biphenyl which was prepared by the following described procedure was taken up in 900 ml. of toluene along with the 200 ml. of cyclohexane which had been charged in the reaction. This solution was then added slowly, over a three-hour period, into a mixture of 70 gms. zinc chloride and 100 ml. of toluene. After evolution of hydrochloric acid had stopped, the novolak resin produced was recovered by washing and drying as described in Example I. 178 gms. of the pink sticky solid resin were recovered.

The procedure for chloromethylating biphenyl was to charge 102.6 gms. of biphenyl and 46 gms. of paraformaldehyde to an autoclave type, one-liter reaction flask along with a catalyst comprising 160 gms. of zinc chloride, 70 ml. of concentrated HCl (37%) and 160 ml. of glacial acetic acid, and 200 ml. of cyclohexane as the solvent. The reaction mixture was stirred rapidly while a stream of dry hydrogen chloride gas was passed into the reaction flask just below the liquid level. The heat of reaction brought the temperature to 55° C. in one-half hour and this temperature was maintained by a water bath (58–60° C.) for a total of 5⅓ hours. The crude bis-(chloromethyl) biphenyl product obtained weighed 147 gms.

20 gms. of the novolak of this example were charged to a 300 ml. round bottom flask equipped with an unpacked column. 10 ml. of an aqueous 37% formaldehyde solution, 40 ml. toluene and 4 drops of concentrated hydrochloric acid were added to the flask prior to heating. The reaction mixture was heated to dryness to produce a pale brown color, almost pink, brittle solid which was ground to a powder. Two molding samples were prepared using this molding powder at a mold temperature of 200° C. and at graduated mold pressures of 1,000 p.s.i. for 1 minute, 2,000 p.s.i. for 2 minutes and 3,000 p.s.i. for 3 minutes. Both molds prepared were well formed, smooth and pale brown in color.

*Example IV*

To compare the deterioration resistance of molding resins of this invention with conventional phenol-formaldehyde (Bakelite) molding powder, molded samples as prepared in Examples I, II and III and molded samples prepared from Bakelite black molding powder obtained from Fisher Chemical Company, Cat. No. 12–253, Lot No. 781,231 were subjected to acid, alkali and oxidizing agents. The results of this treatment were as follows:

TABLE I

|  | New Resin Molds [1] | Conventional Resin Molds [2] |
|---|---|---|
| Boiling 30% NaOH | Boiled 4 hours, observed no effect. | Boiled 4 hours, surface cracking and blistering. |
| Boiling 30% H₂SO₄ | No observable effects | No observable effects. |
| Boiling 50% Commercial "Clorox." | Slight surface attack after one hour. No bleaching noticed. Cold Clorox had no effect. | Surface pitted and cracked after one hour. Color bleached. Cold Clorox had no effect. |
| Boiling 70% H₂SO₄ | Small blisters and darkened slightly in 2 hours. | Pitted and blistered in 2 hours boiling. |
| Cold, con. Nitric Acid. | On 8 hours standing— no observed effect. | Cracking and pitting of surface after 8 hours standing. |

[1] bis-(chloromethyl) biphenyl-phenol-aldehyde molding resin.
[2] Bakelite phenol-formaldehyde molding resin.

It is obvious from the above results, that the molding and coating resin of this invention has superior deterioration resistance than conventional phenol-formaldehyde molding resin.

To demonstrate the usefulness of the invention for several commercial type molding preparations the following examples are set forth.

*Example V*

125 gms. of phenol, 0.25 gms. of zinc chloride and 50 ml. of benzene were charged to a 3-liter, 3-neck round bottom flask equipped with stirrer, thermometer, reflux condenser and dropping funnel. The mixture was brought to reflux temperature (80° C.) and 322 gms. of crude 4,4'-bis-(chloromethyl) biphenyl, from the chloromethylation of biphenyl as described in Example III, dissolved in toluene and cyclohexane was slowly dropped into the flask for a period of two hours. Agitation was continued for another hour to complete the evolution of HCl and to produce a pale pink solution. The solvent was removed under 25 mm. mercury pressure until the mixture was a syrupy mass but still stirrable. 155 ml. of formaldehyde (37%) was added to this mixture and the mass was agitated for ten minutes at 80° C. All of the solvents were then removed under 25 mm. of mercury pressure and the temperature again brought to 80° C. 358 gms. of a pale pink viscous solid remained which became brittle at room temperature. This novolak was removed and crushed to a coarse powder.

Two molding compositions were prepared with the above novolak to be used for molding small one-inch diameter discs. The first of these preparations contained an alkaline catalyst and was as follows:

10.0 gms. novolak
5.0 gms. wood flour (filler)
2.5 gms. hexamethylene tetramine
0.1 gm. zinc stearate (lubricant)

The hexamethylene tetramine supplied sufficient formaldehyde for cross-linking and the liberated ammonia acted as a catalyst.

The second molding preparation contained an acid catalyst and was as follows:

10.0 gms. novolak
5.0 gms. wood flour (filler)
1.5 gms. paraformaldehyde
0.1 gm. phthalic anhydride
0.1 gm. zinc stearate (lubricant)

The phthalic anhydride acted as the acid catalyst in promoting cross-linking by formaldehyde (from paraformaldehyde).

Each of the above molding preparations were mixed, ground in a mortar and passed through an 80 mesh screen in preparation for molding.

The molding apparatus comprised a Beuhler laboratory press of 15,000 pounds per square inch capacity and containing a fully positive type compression mold assembly. The mold produced a disc one inch in diameter with a thickness depending on the amount of the molding composition charged. The assembly was heated with an automatic electric heater. The best moldings were produced with temperatures within the range of 300 to 360° F., at pressures in the range of 4,000 to 8,000 p.s.i., and for molding periods of from 3 to 5 minutes.

The moldings produced with both the acid catalyzed molding composition and the alkaline catalyzed molding composition under the above conditions were smooth, uniform, hard, strong articles. Under the prescribed pressure and temperature conditions, a molding period of less than 3 minutes was not sufficient to completely set the resin while a longer molding period, particularly at the higher end of the temperature range produced darker moldings evidencing charred filler material.

While preferred embodiments of the invention have been disclosed, the description is intended to be illustrative and it is to be understood that changes and variations may be made without departing from the spirit

We claim:
1. A novolak having the following general formula

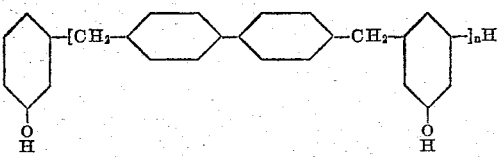

wherein $n$ is a whole number ranging from 4 to 10.

2. A method of preparing a novolak which comprises reacting 4,4'-bis-(chloromethyl) biphenyl with phenol at a mol ratio of from 0.65 to 0.95 of biphenyl per mol of phenol in the presence of a metallic halide catalyst at refluxing temperature.

3. The method of claim 2 wherein 0.25 to 0.5 mol of 4,4'-bis-(chloromethyl) biphenyl per mol of phenol is substituted by formaldehyde.

4. A resinous reaction product of the novolak of claim 1 with an aldehyde.

5. A resinous reaction product of the novolak of claim 1 with formaldehyde.

6. The resinous reaction product of claim 1 with epichlorohydrin.

7. The method of forming a molding and coating resin which comprises reacting a novolak having the following general formula

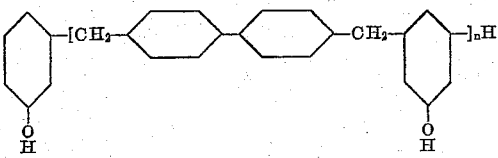

wherein $n$ is a whole number ranging from 4 to 10, with a curing agent in the presence of a catalyst.

8. The method of forming a molding and coating resin which comprises reacting a novolak having the general formula

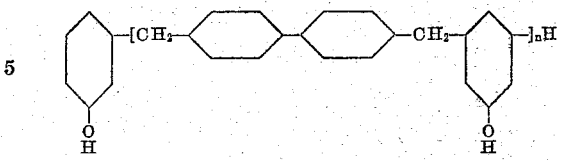

wherein $n$ is a whole number ranging from 4 to 10, with an aldehyde in the presence of an acid catalyst.

9. The method of forming a molding and coating resin of claim 8 with formaldehyde in the presence of hydrochloric acid.

10. The method of forming a molding and coating resin of claim 8 with paraformaldehyde in the presence of phthalic anhydride.

11. A method of forming a molding and coating resin which comprises reacting a novolak having the general formula

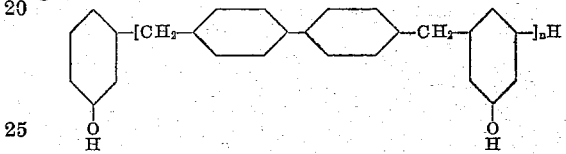

wherein $n$ is a whole number ranging from 4 to 10, with an aldehyde in the presence of a basic catalyst.

12. The method of forming a molding and coating resin of claim 11 with formaldehyde in the presence of ammonia.

13. The method of forming a molding and coating resin of claim 12 wherein both the formaldehyde and ammonia is supplied by the presence of hexamethylene tetramine.

References Cited in the file of this patent
UNITED STATES PATENTS

| | | |
|---|---|---|
| 1,793,310 | Ellis | Feb. 17, 1931 |
| 2,453,298 | Bloch | Nov. 9, 1948 |
| 2,914,489 | Hall | Nov. 24, 1959 |

FOREIGN PATENTS

| | | |
|---|---|---|
| 205,495 | Austria | Sept. 25, 1959 |